(12) United States Patent
Shih et al.

(10) Patent No.: US 11,492,069 B2
(45) Date of Patent: Nov. 8, 2022

(54) BRAKE LEVER ASSEMBLY FOR HYDRAULIC BRAKE SYSTEM

(71) Applicants: Chi-Teng Shih, Changhua County (TW); Jhe-Wei Syu, Changhua County (TW)

(72) Inventors: Chi-Teng Shih, Changhua County (TW); Jhe-Wei Syu, Changhua County (TW)

(73) Assignee: ALHONGA ENTERPRISE CO., LTD., Changhua County (TW)

( * ) Notice: Subject to any disclaimer, the term of this patent is extended or adjusted under 35 U.S.C. 154(b) by 190 days.

(21) Appl. No.: 17/087,622

(22) Filed: Nov. 3, 2020

(65) Prior Publication Data
US 2022/0135175 A1   May 5, 2022

(51) Int. Cl.
*B62L 3/02* (2006.01)
(52) U.S. Cl.
CPC ..................... *B62L 3/023* (2013.01)
(58) Field of Classification Search
CPC ........................................................ B62L 3/023
See application file for complete search history.

(56) References Cited

U.S. PATENT DOCUMENTS

| 6,370,877 | B1 * | 4/2002 | Lin | G05G 1/10 |
| | | | | 60/588 |
| 2007/0215416 | A1 * | 9/2007 | Chen | B62L 3/023 |
| | | | | 188/344 |
| 2009/0120751 | A1 * | 5/2009 | Lin | B62M 25/08 |
| | | | | 188/344 |
| 2009/0152062 | A1 * | 6/2009 | Tsai | B60T 17/04 |
| | | | | 188/344 |
| 2011/0240426 | A1 * | 10/2011 | Hirose | B60T 7/102 |
| | | | | 188/344 |
| 2019/0061869 | A1 * | 2/2019 | Komada | B62K 23/06 |
| 2020/0079465 | A1 * | 3/2020 | Tsai | B62L 3/023 |

FOREIGN PATENT DOCUMENTS

TW       M542602 U  *  1/2017   .............. B62L 3/023

OTHER PUBLICATIONS

Machine translation of TW M542602 U, Kuo, Yung Pin, Jan. 6, 2017 (Year: 2017).*

* cited by examiner

*Primary Examiner* — Vinh Luong

(57) ABSTRACT

A brake lever assembly includes a body, a seat and a pin. The body is connected to the seat and includes an outer surface which is engaged with an inner surface of the seat so that the body cannot rotate relative to the seat. The seat is connected to a brake lever and a handlebar. The body is connected to an adapter which is connected with a hydraulic oil pipe. A piston is located in the body and activated by the brake lever. The pin extends through the seat and the body to prevent the body from dropping from the receiving hole axially. The brake lever assembly is easily installed to the handlebar.

8 Claims, 10 Drawing Sheets

BRAKE LEVER ASSEMBLY FOR HYDRAULIC BRAKE SYSTEM

BACKGROUND OF THE INVENTION

1. Fields of the Invention

The present invention relates to a brake lever assembly, and more particularly, to a brake lever assembly for a bicycle hydraulic brake system.

2. DESCRIPTIONS OF RELATED ART

The conventional brake systems for bicycles can be cataloged into the cable brake system and the hydraulic brake system. The hydraulic brake system is cooperated with disc brake wheels, and uses hydraulic oil to activate calipers located on two sides of the disc brake rotor to stop rotation of the disc brake rotor to stop the bicycles. It is noted that the brake lever assembly is installed to the handlebar and includes a brake lever which activates a cylinder so as to transfer hydraulic oil to move the calipers to contact the stop the disc brake rotor. There are multiple parts involved with the brake lever assembly, and these parts are interconnected with each other so as to function properly. The brake lever assembly includes a complicated outer appearance which is difficult to be manufactured.

The present invention intends to provide a brake lever assembly for a bicycle hydraulic brake system, and the brake lever assembly of the present invention is easily assembled and manufactured so as to eliminate shortcomings mentioned above.

SUMMARY OF HE INVENTION

The present invention relates to a brake lever assembly and comprises a body, a seat and a pin. The body includes an outer surface, and a first passage is defined axially through the body. A piston is located in the first passage. The seat includes a first portion, a second portion and a third portion. The third portion includes a receiving hole, and the body is partially located in the receiving hole. The receiving hole includes an inner surface which is engaged with the outer surface of the body so that the body is not rotated relative to the receiving hole of the seat. The first portion is connected with a handlebar. A brake lever is pviotably connected to the second portion so as to operate the piston in the first passage of the body. A pin extends through the third portion of the seat and the body to prevent: the body from dropping from the receiving hole axially.

The primary object of the present invention is to provide a brake lever assembly for a bicycle hydraulic brake system, and the brake lever assembly is easily installed to the handlebar.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
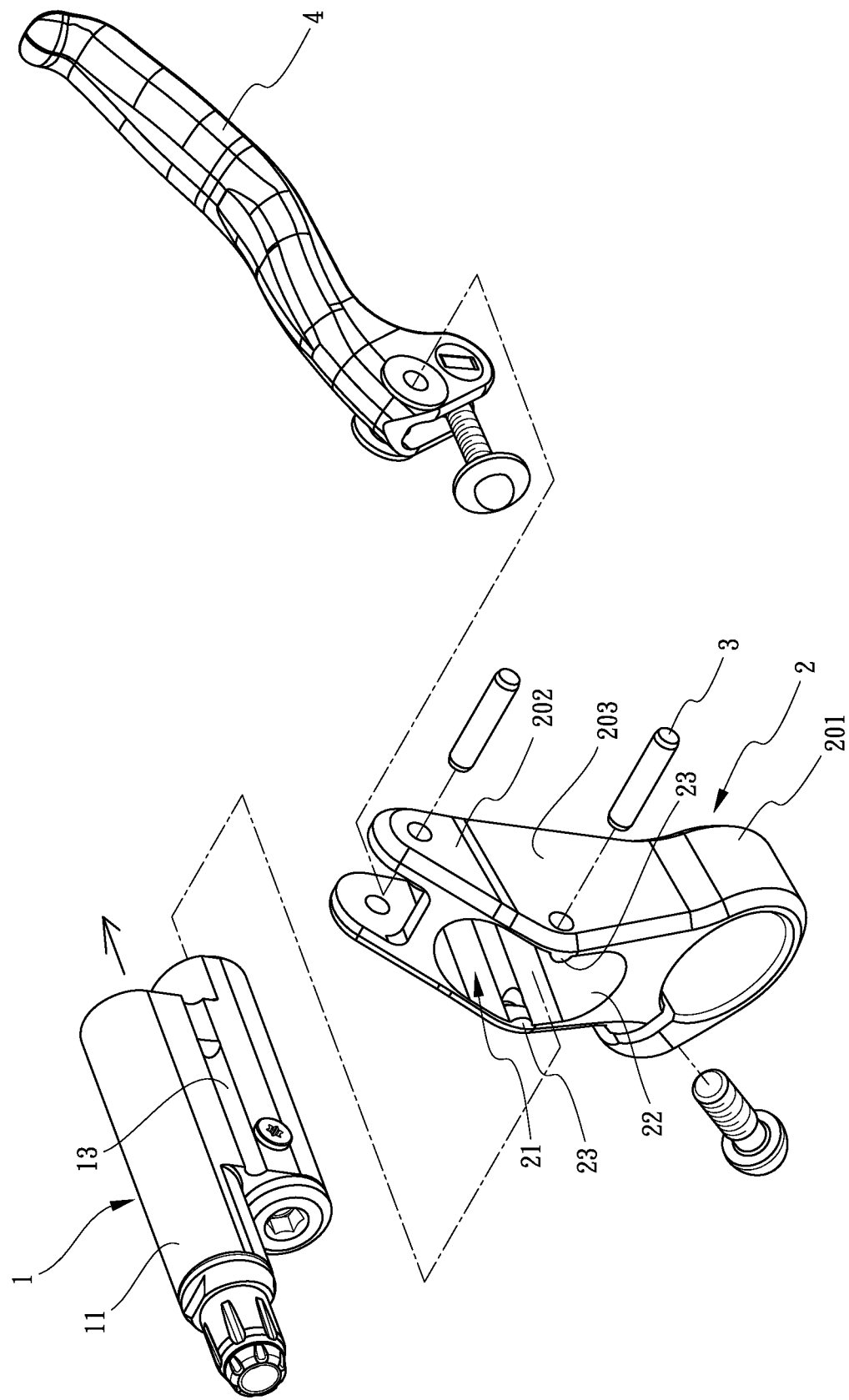
FIG. 1 is an exploded view of the brake lever assembly of the present invention.
Figure 2:
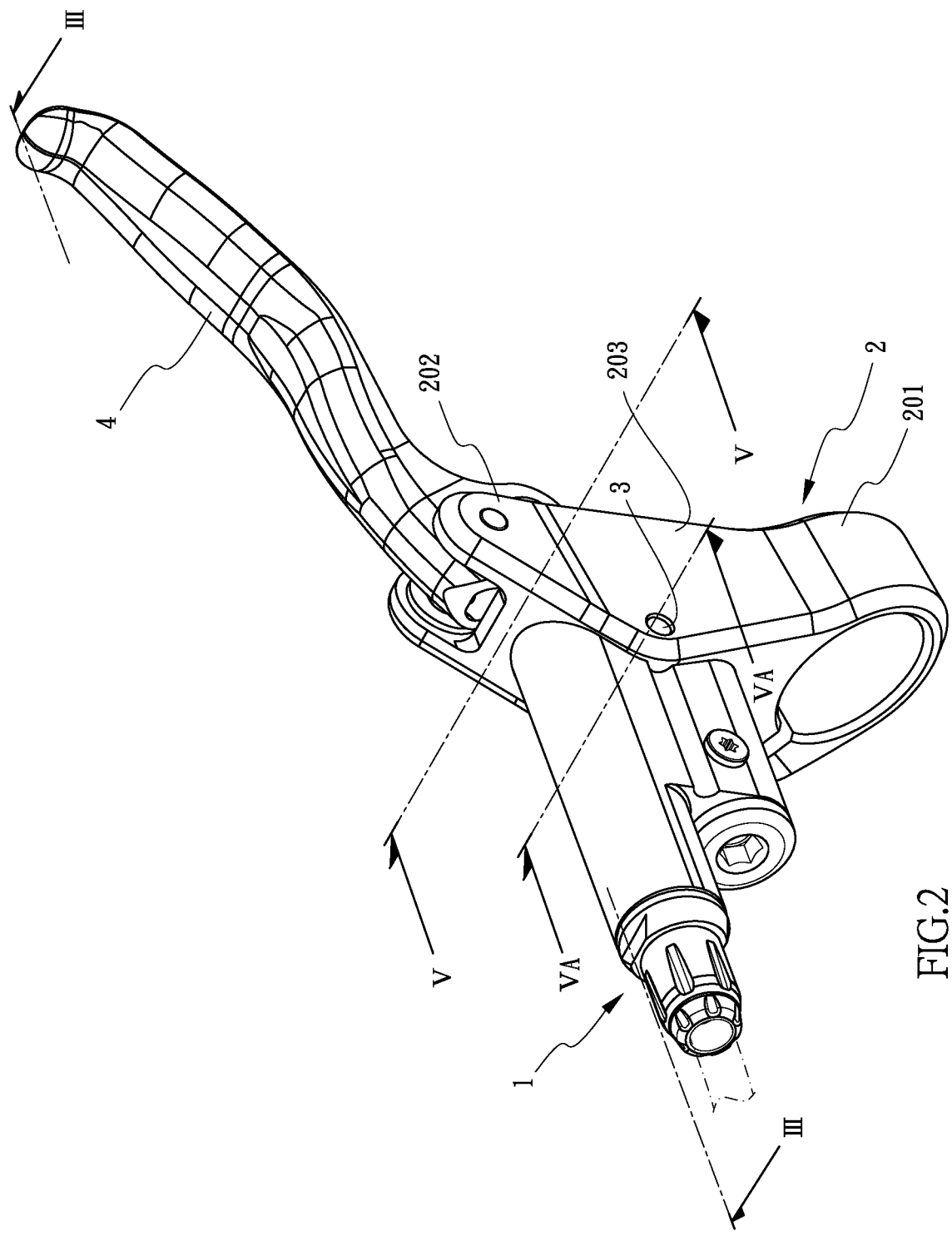
FIG. 2 is a perspective view to show the brake lever assembly of the present invention.
Figure 3:
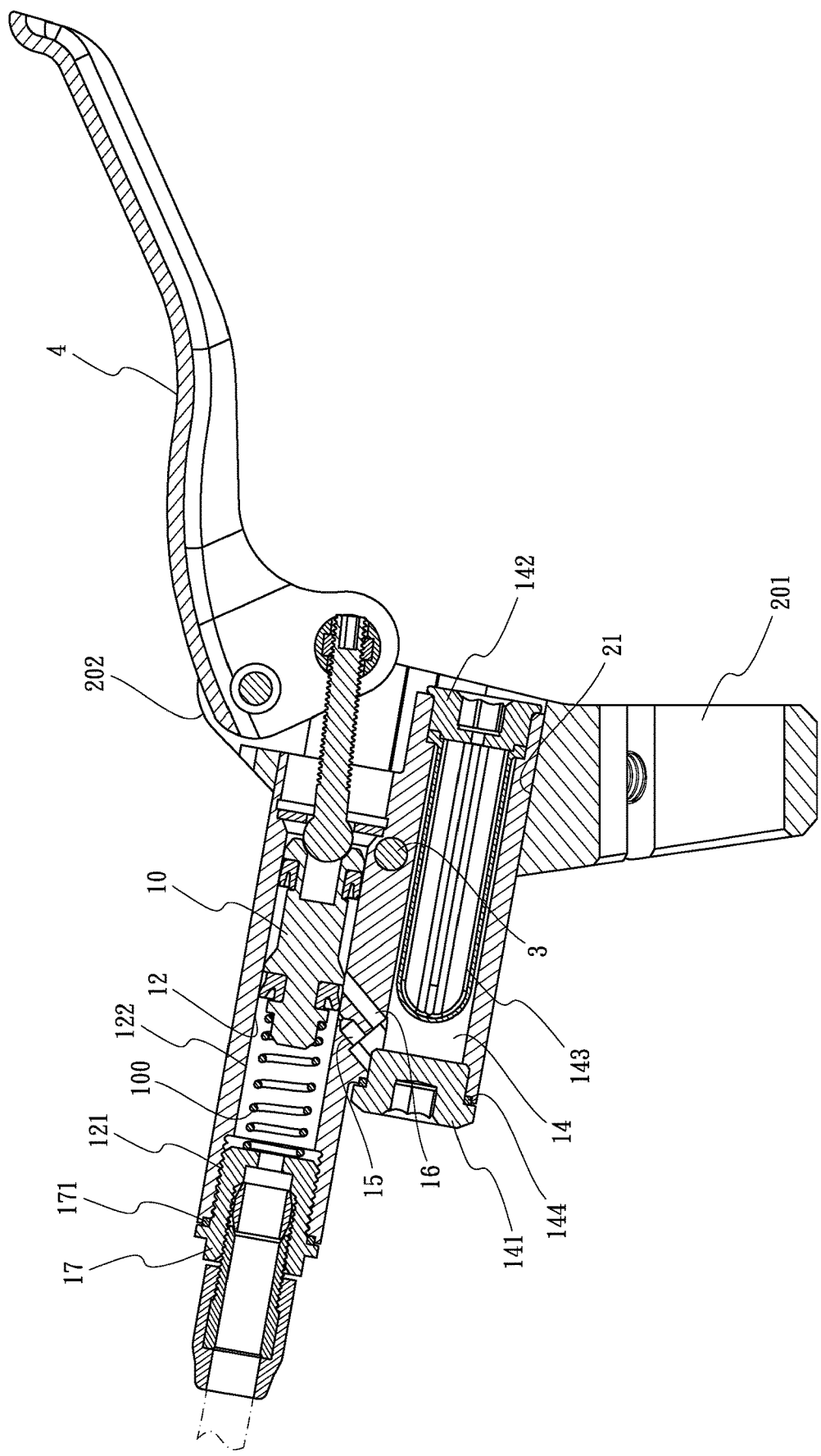
FIG. 3 is a cross sectional view, taken along line III-III in FIG. 2.

Referring to FIGS. 1 to 3, the brake lever assembly of the present invention comprises a body 1, a seat 2 and a pin 3. The body 1 includes an outer surface 11, and a first passage 12 is defined axially through the body 1. A piston 10 is located in the first passage 12. The seat 2 includes a first portion 201, a second portion 202 and a third portion 203. The third portion 203 includes a receiving hole 21, and the body 1 is partially located in the receiving hole 21. The receiving hole 21 includes an inner surface 22 which is engaged with the outer surface 11 of the body 1 so that the body 1 is not rotated relative to the receiving hole 21. The first portion 201 is adapted to be connected with a handlebar (not shown), and a brake lever 4 is pivotably connected to the second portion 202 so as to operate the piston 10 in the first passage 11 of the body 1. The pin 3 extends through the third portion 203 of the seat 2 and the body 1 to prevent the body 1 from dropping from the receiving hole 21 axially as shown in FIG. 5A.

The body 1 is easily and conveniently installed to the seat 2 by engaging the outer surface 11 of the body 1 with the inner surface 22 of the seat 2. The body 1 is not rotated relative to the seat 2. The pin 3 extends through the seat 2 and the third portion 203 of the body 1 to firmly connect the seat 2 to the body 1. The pin 3 can be replaced by a bolt, an expansion bolt, a rod or a spring pin. The outer surface 11 and the inner surface 22 can be a flat surface or a non-flat surface. The body 1 can be installed to the receiving hole 21 from two ends of the receiving hole 21 of the seat 2 as shown by the arrow heads in FIGS. 1 and 4.

Figure 4:
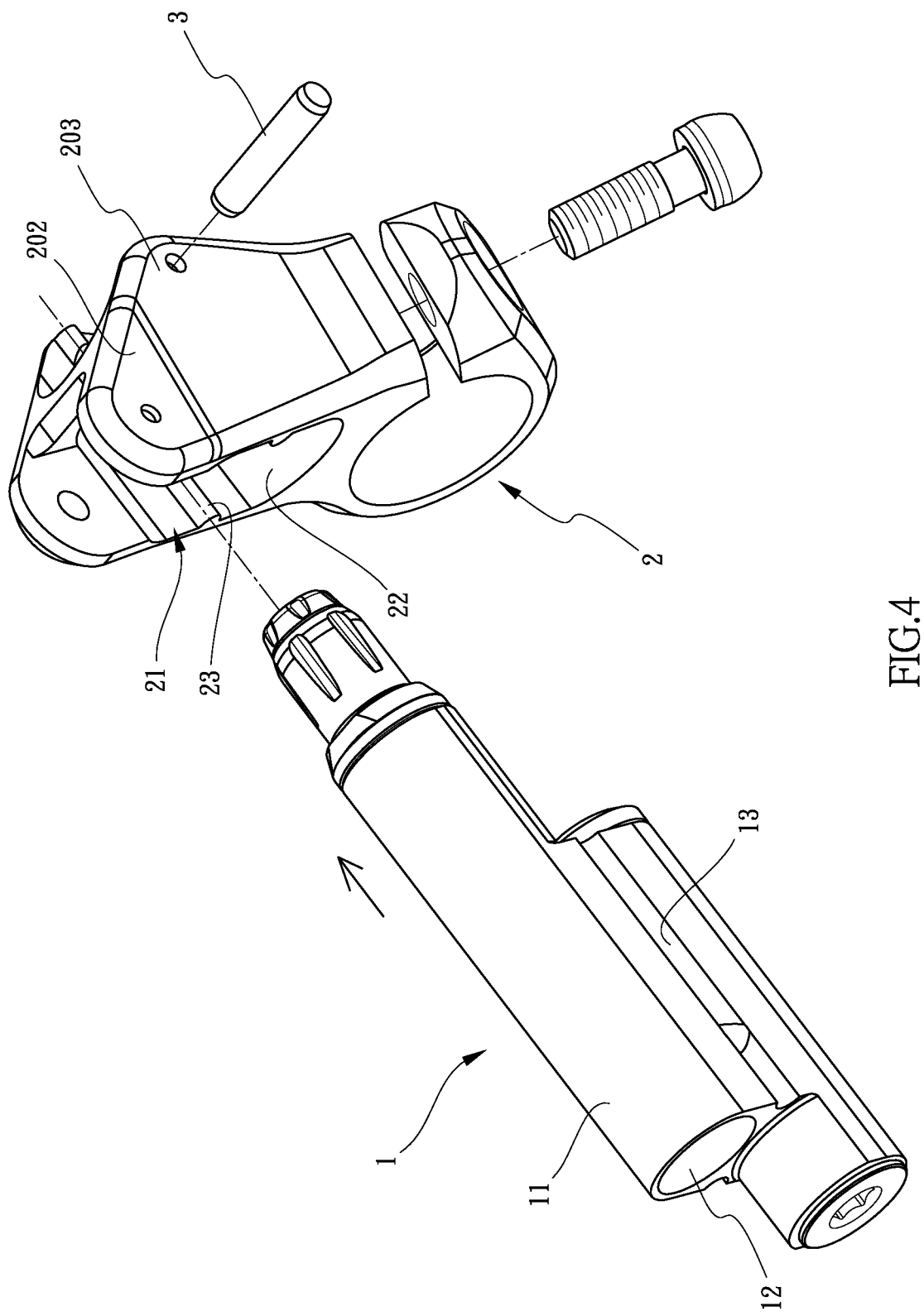
FIG. 4 is an exploded view to view the body and the seat of the brake lever assembly of the present invention.
Figure 5:
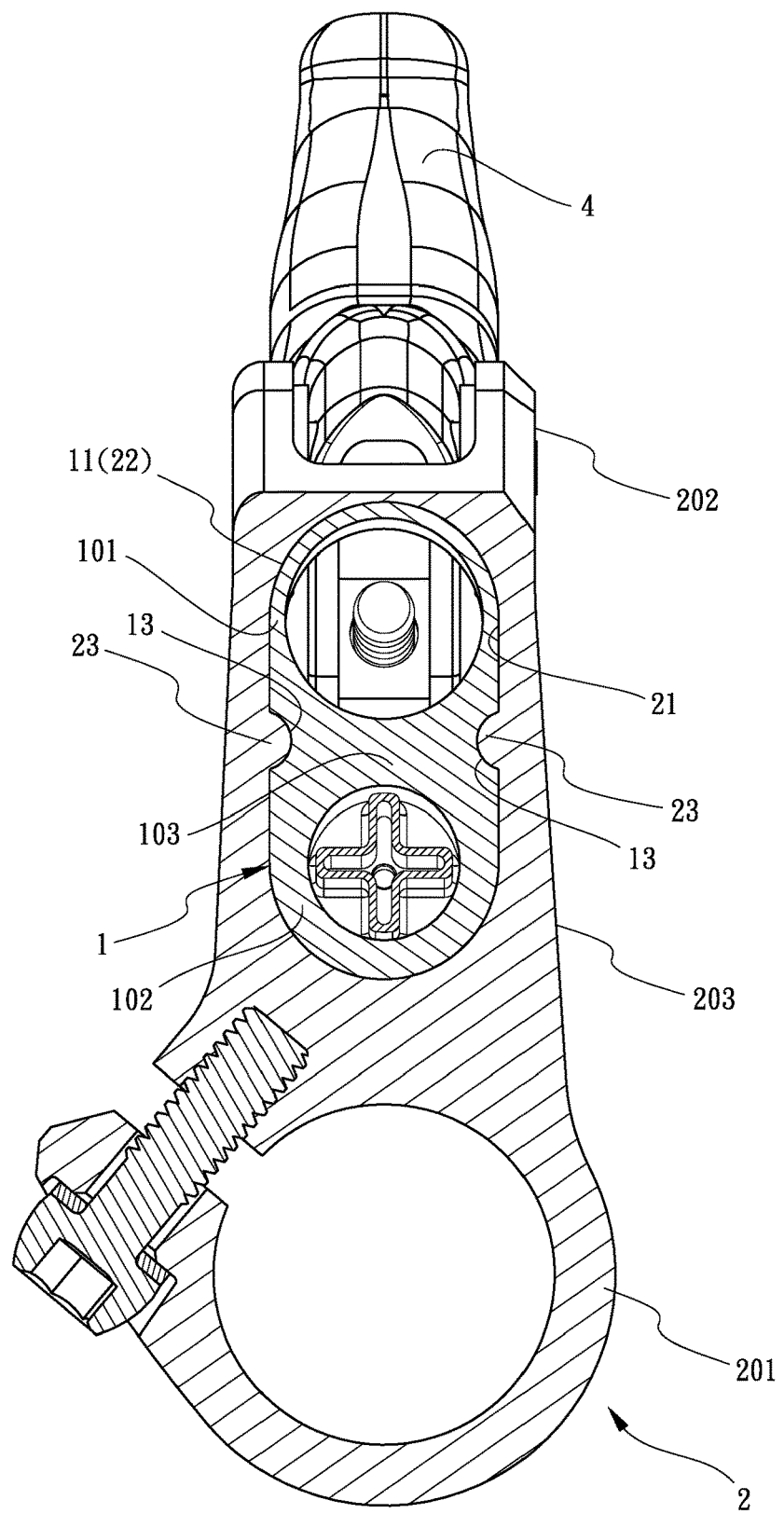
FIG. 5 is a cross sectional view, taken along line V-V in FIG. 2.
Figure 5A:
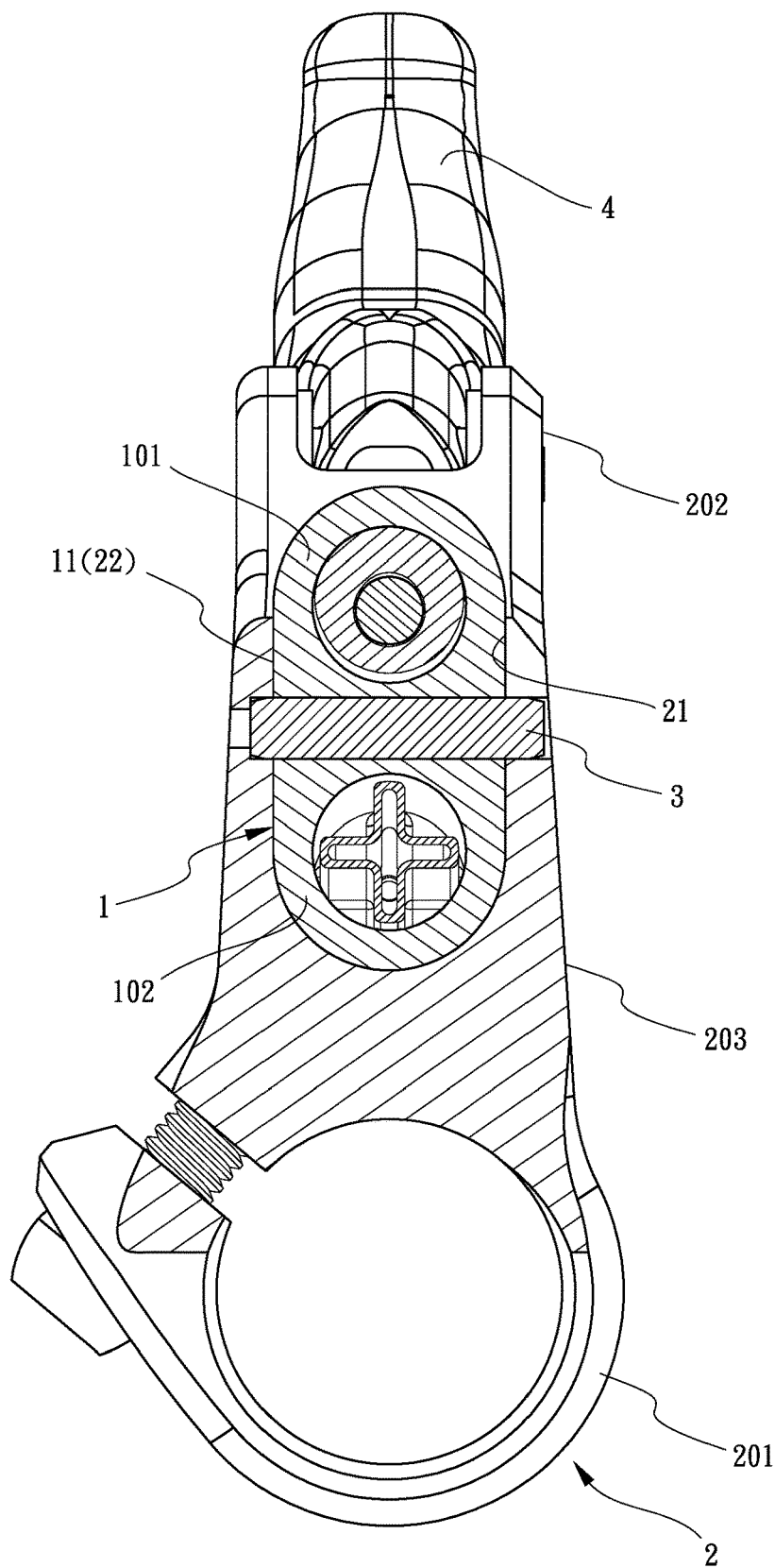
FIG. 5A is a cross sectional view, taken along line VA-VA in FIG. 2.

As shown in FIGS. 1, 4 and 5, multiple ridges 23 extend from the inner surface 22 of the seat 2, and multiple grooves 13 are formed in the outer surface 11 of the body 1. The ridges 23 are slidably engaged with the grooves 13 when the body 1 is installed to the seat 2. The pin 3 extends through the ridges 23 and the grooves 13.

Figure 6:
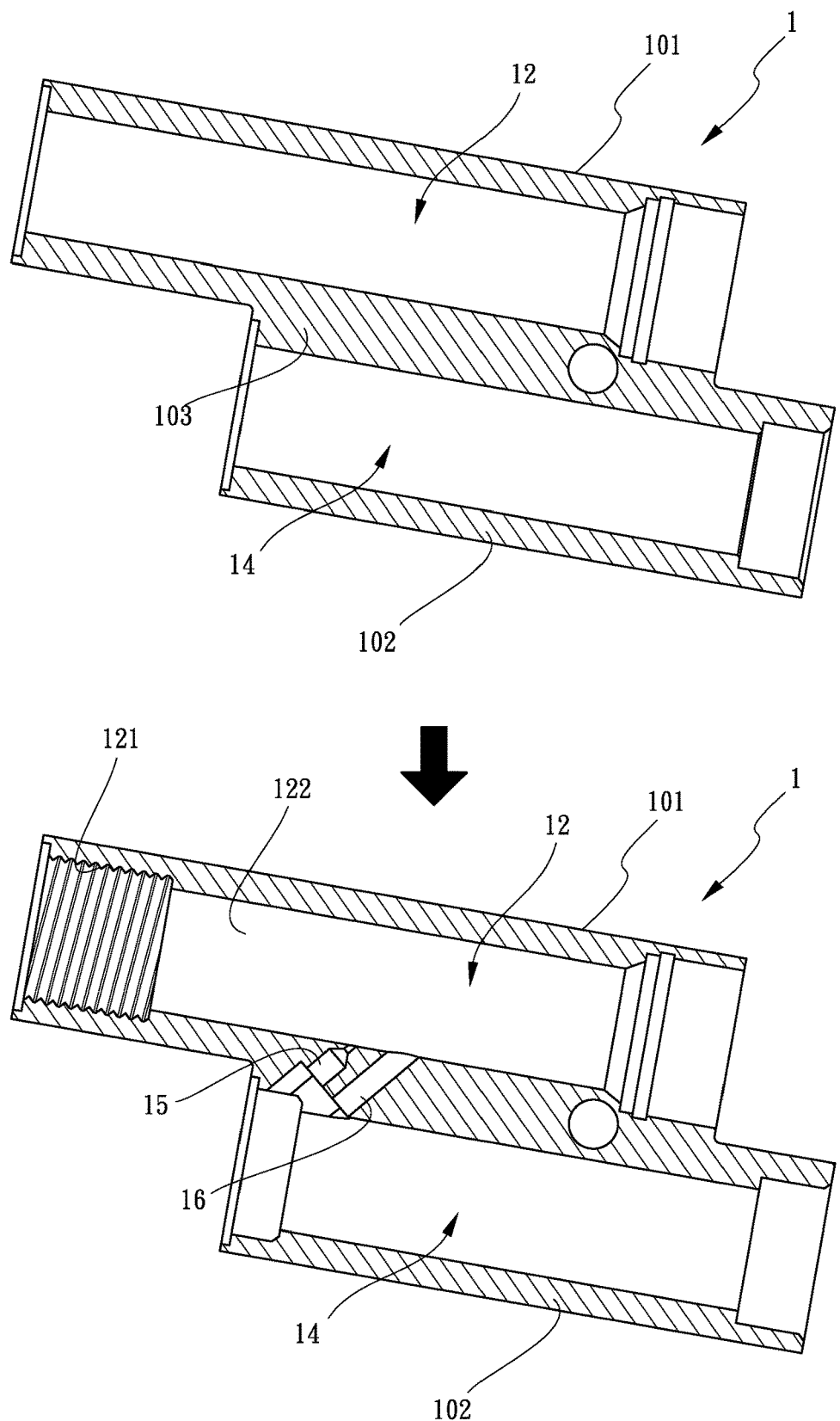
FIG. 6 illustrates how the first and second paths are formed in the bridge of the body.

The body 1 and the seat 2 can be made by way of die casting, forging, or aluminum extruding. As shown in FIG. 6, the body 1 includes a first part 101, a second part 102 and a bridge 103 formed between the first and second parts 101, 102. The first passage 12 is defined through the first part 101. The first passage 12 includes a threaded section 121 and a smooth section 122 formed in the inner periphery thereof. The second part 102 includes a second passage 14 defined therethrough. The bridge 103 of the body 1 includes a first path 15 and a second path 16 respectively defined therethrough. The first and second paths 15, 16 communicate with the first and second passage 12, 14. When the body 1 is initially manufactured to have the first part 101, the second part 102, the bridge 103, the first passage 12 and the second passage 14 as shown as the upper portion of FIG. 6. The threaded section 121 is manufactured by Inserting a tool (not shown) into the first passage 12. The first and second paths 15, 16 are formed in the bridge 103 by inserting another tool (not shown) into the second passage 14 as shown as the lower portion of FIG. 6. The grooves 13 are formed defined in the bridge 103 as shown in FIG. 5. The ridges 23 are located corresponding to the bridge 103. The manufacturing of the first part 101, the second part 102, the bridge 103, the first passage 12, the second passage 14, the threaded section 121, and the first and second paths 15, 16 to the body 1 is easy and convenient.

As shown in FIG. 3, an adapter 17 is threadedly connected to the threaded section 121 of the first passage 12 so that a hydraulic oil pipe (not shown) is connected to the adapter 17. The piston 10 is movably located in the smooth section 122 of the first passage 12. The minimum diameter of the threaded section 121 is larger than the minimum diameter of the smooth section 122.

A first cap 141 and a second cap 142 are respectively connected to two ends of the second passage 14. An air bladder 143 is located in the second passage 14 and communicates with outside of the second passage 14 via the second cap 142. The first cap 141 is located close to the first path 15 and is not in contact with the air bladder 143.

Figure 7:
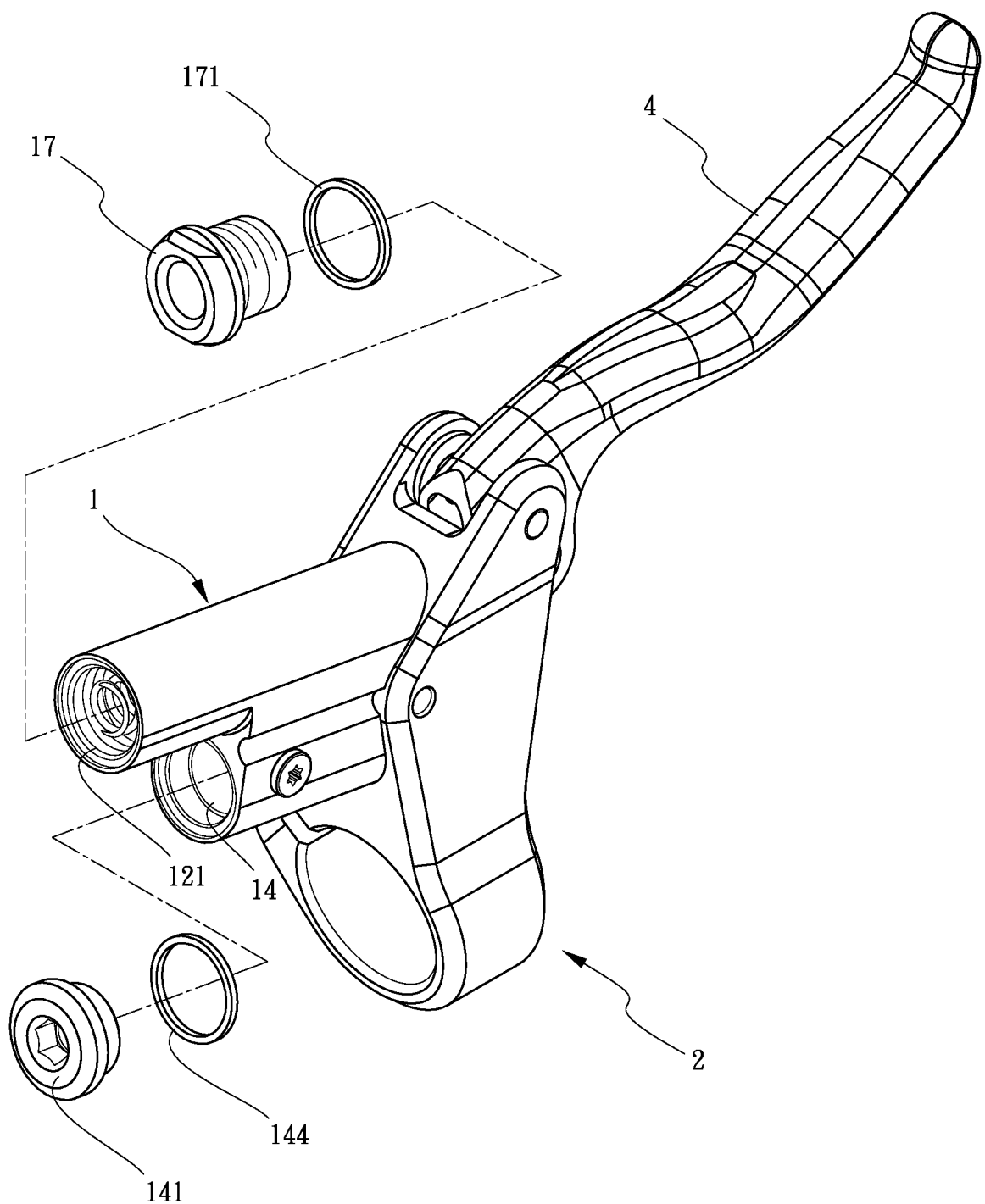
FIG. 7 shows that the first cap, the first seal ring, the adapter and the second seal ring are to be installed to the body of the brake lever assembly of the present invention.
Figure 8:
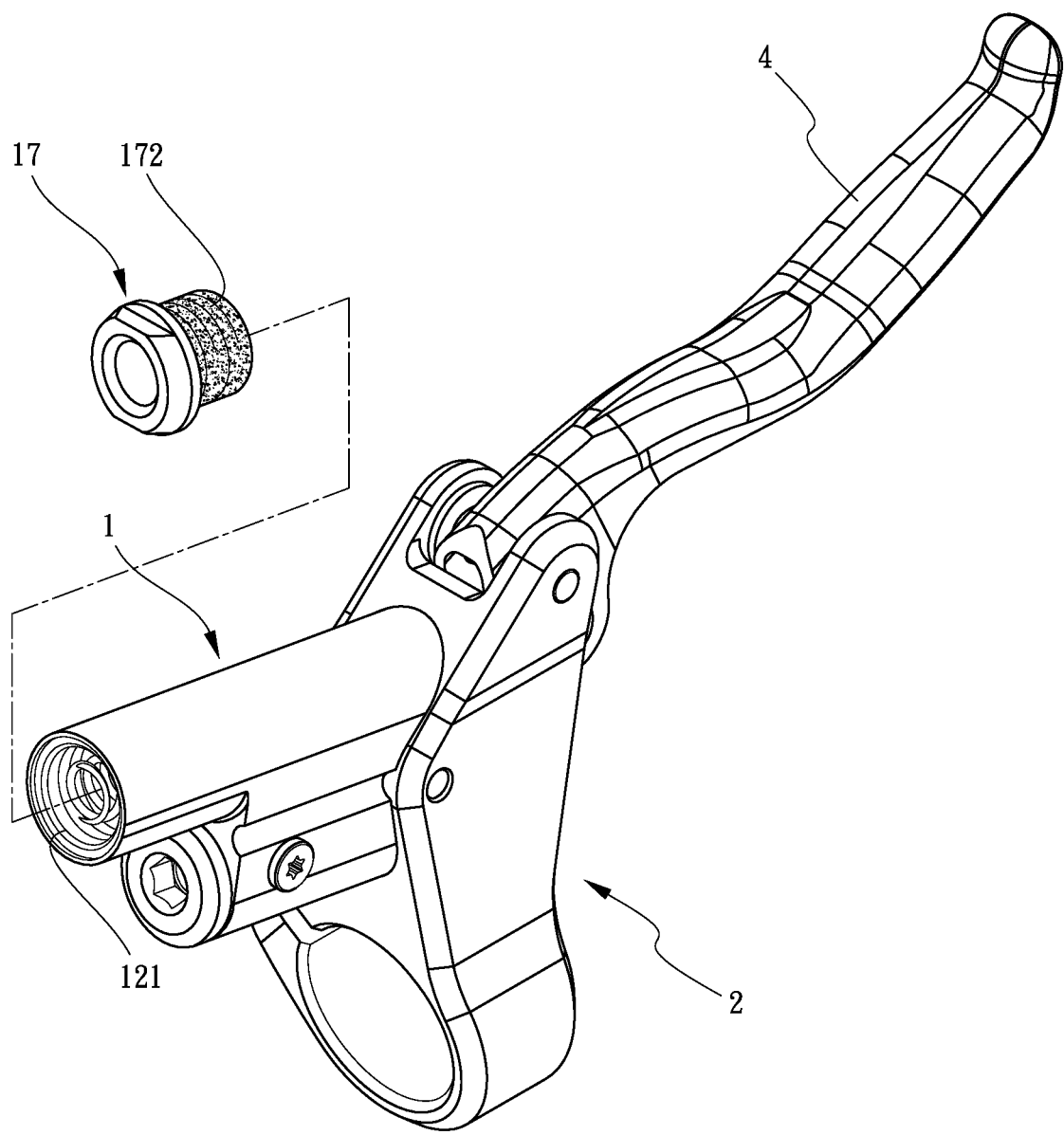
FIG. 8 shows that the adapter has a sealing material applied thereto.
Figure 9:
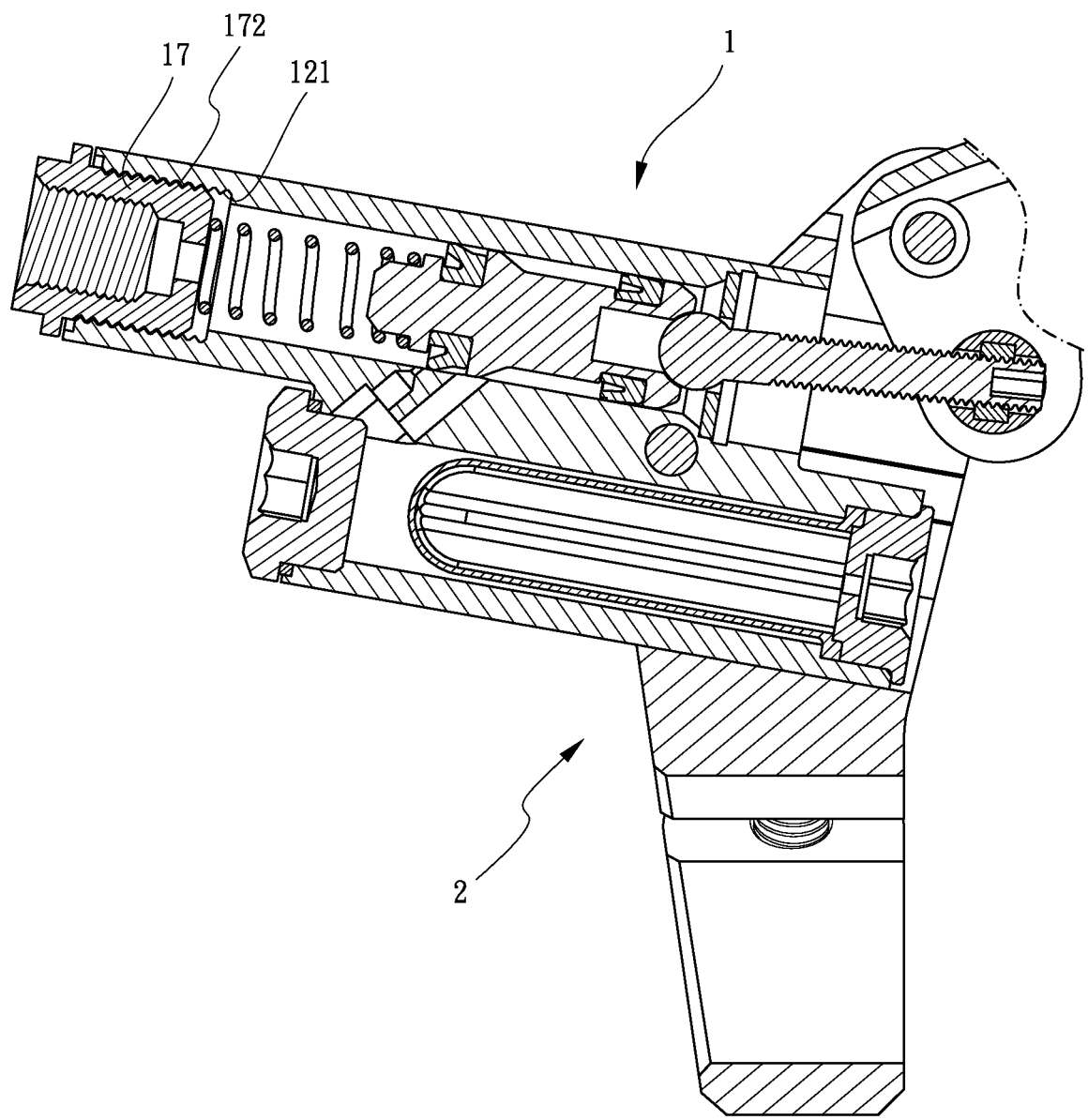
FIG. 9 shows that the sealing material is located between the adapter and the threaded section of the first passage.

In order to prevent leakage between the first cap 141 and the second passage 14 of the body 1, a first seal ring 144 is mounted to the first cap 141 and contacts one end of the second passage 14 of the body 1. In order to prevent leakage between the adapter 17 and the threaded section 121 of the body 1, as shown in FIGS. 3 and 7, a second seal ring 171 is mounted to the adapter 17 and contacts one end of the body 1. The second seal ring 171 is located close to the threaded section 121. Alternatively, as shown in FIGS. 8 and 9, a sealing material 172, such as sealing glue, is applied to the adapter 17 and the threaded section 121.

As shown in FIG. 3, a spring 100 is located in the smooth section 122 and biased between the adapter 17 and the piston 10. When the brake lever 4 is operated, the piston 10 is moved to compress the Spring 100 and squeezes hydraulic oil to activate the brake calipers (not shown). The spring 100 stores energy which is used to bring piston 10 and the brake lever 4 back to their initial positions when the brake lever 4 is released.

While we have shown and described the embodiment in accordance with the present invention, it should be clear to those skilled in the art that further embodiments may be made without departing from the scope of the present invention.

What is claimed is:

1. A brake lever assembly comprising:
   a body having an outer surface, a first passage defined axially through the body, a piston located in the first passage, multiple grooves formed in the outer surface of the body;
   a seat including a first portion, a second portion and a third portion, the third portion including a receiving hole, the body partially located in the receiving hole, the receiving hole including an inner surface which is engaged with the outer surface of the body so that the body is not rotated relative to the receiving hole, the first portion adapted to be connected with a handlebar, multiple ridges extending from the inner surface of the receiving hole of the seat, the ridges engaged with the grooves of the body, a brake lever pivotably connected to the second portion so as to operate the piston in the first passage of the body, and
   a pin extending through the ridges of third portion of the seat and the grooves of the body to prevent the body from dropping from the receiving hole axially.

2. The brake lever assembly as claimed in claim 1, wherein the body includes a first part, a second part and a bridge formed between the first and second parts, the ridges are located corresponding to the bridge.

3. The brake lever assembly as claimed in claim 2, wherein the second part includes a second passage defined therethrough, the first passage is defined through the first part, the bridge of the body includes a first path and a second path respectively defined therethrough, the first and second paths communicate with the first and second passage.

4. The brake lever assembly as claimed in claim 3, wherein a first cap and a second cap are respectively connected to two ends of the second passage, an air bladder is located in the second passage and communicates with outside of the second passage via the second cap, the first cap is located close to the first path and is not in contact with the air bladder.

5. The brake lever assembly as claimed in claim 4, wherein a first seal ring is mounted to the first cap and contacts one end of the second passage of the body.

6. The brake lever assembly as claimed in claim 1, wherein the first passage includes a threaded section and a smooth section formed in an inner periphery thereof, an adapter is threadedly connected to the threaded section of the first passage, the piston is movably located in the smooth section of the first passage, a minimum diameter of the threaded section is larger than a minimum diameter of the smooth section.

7. The brake lever assembly as claimed in claim 6, wherein a sealing material is applied to the adapter and the threaded section.

8. The brake lever assembly as claimed in claim 6, wherein a spring is located in the smooth section and biased between the adapter and the piston.

* * * * *